United States Patent

[11] 3,588,074

| [72] | Inventor | John Ochs<br>2923 Yearling St., Lakewood, Calif. 90712 |
|---|---|---|
| [21] | Appl. No. | 831,457 |
| [22] | Filed | June 9, 1969 |
| [45] | Patented | June 28, 1971 |

[54] DEVICE FOR SECURING AND ADJUSTING SPRINGS
7 Claims, 5 Drawing Figs.

| [52] | U.S. Cl. | 267/73, 267/177 |
|---|---|---|
| [51] | Int. Cl. | F16f 1/12 |
| [50] | Field of Search | 267/177, 69, 73, 74, 179 |

[56] References Cited
UNITED STATES PATENTS

| 2,265,629 | 12/1941 | Christiansen | 267/74 |
|---|---|---|---|
| 2,684,238 | 7/1954 | Robinson | 267/73 |
| 2,846,212 | 8/1958 | Morneau | 267/74 |

*Primary Examiner*—James B. Marbert
*Attorney*—Whann & McManigal

ABSTRACT: The application discloses a device for securing garage door springs in place including a threaded rod hooked at one end and having a slideable sleeve thereon provided with an oppositely facing hook together with nuts threaded on the rod beyond each end of the sleeve.

PATENTED JUN28 1971
3,588,074
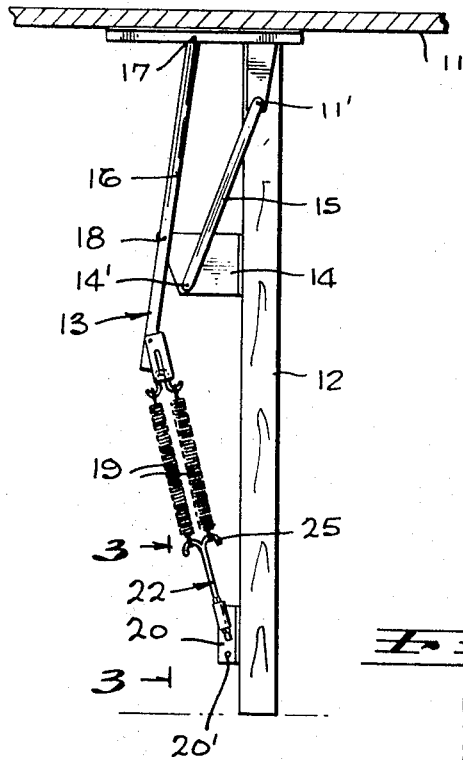
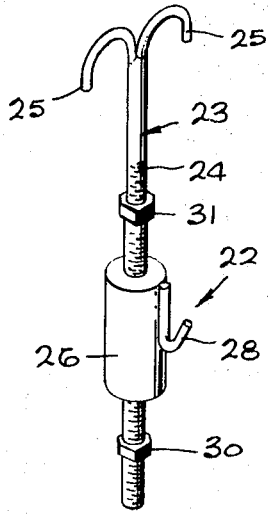
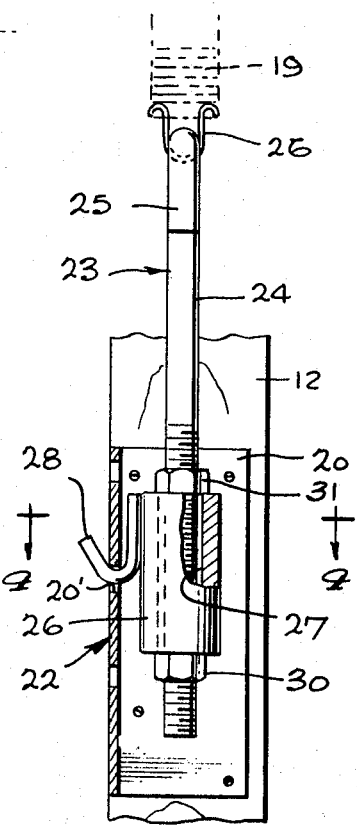
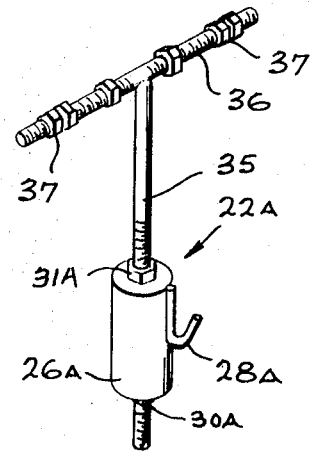
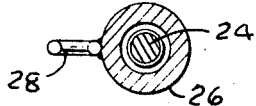
JOHN OCHS
INVENTOR.
BY
Mason & Graham
ATTORNEYS

DEVICE FOR SECURING AND ADJUSTING SPRINGS

This invention relates generally to special fittings, brackets, hooks and the like used for the purpose of securing an end of a tension spring to an anchor point and particularly to such devices as are used for securing the tension springs incorporated in the hardware suspension systems of the overhead or upwardly swinging type of garage doors.

The common upwardly opening or swinging type of garage door usually employs at least one and customarily two extremely stiff, helically coiled tension springs at each side which must be installed under considerable tension in order to be effective. The strength and stiffness of these springs is so great that, without special equipment, it is very difficult for most people to install or replace or even adjust the tension of the springs.

Therefore it is an object of the present invention to provide a new and improved device particularly designed for securing and for adjusting a garage door spring of the type referred to above, but also having other uses.

Another object is to provide a device which readily attaches either to a single spring or to a pair of springs at one end and which can be readily attached to an anchor bracket or the like on a door frame at the other end and which provides for initial ease of installation with the spring in a nontensioned condition and the subsequent adjustment thereof to place the spring in the required degree of tension.

A further object is to provide a device of the type indicated which, when installed, is so designed and constructed that it readily pivots with the spring (or springs) to which it is connected as the garage door opens and closes, thereby obviating any possibility of the springs binding.

A still further object is to provide such a device which inherently offers a safeguard against the second spring of a pair coming loose and breaking or failing when the first spring fails.

By way of summary, the invention resides in the provision of a threaded rod with a hooked end having an axially slideable sleeve thereon with a hook rigidly fixed to the sleeve and facing the hooked end of the rod, together with nuts on the rod for bringing about a movable positioning of the sleeve relative to the rod and locking the parts in a given position.

These and other objects will be apparent from the drawing and the following description. Referring to the drawing:

FIG. 1 is an elevational view of the hardware at one side of an overhead swinging garage door, the latter being fragmentarily shown in section and a device embodying the invention being included in the view;

FIG. 2 is an isometric view of the device embodying the invention shown in FIG. 1;

FIG. 3 is a sectional elevational view on line 3-3 of FIG. 1, but on a larger scale;

FIG. 4 is a cross-sectional view through the device alone on line 4-4 of FIG. 3; and FIG. 5 is an isometric view, similar to FIG. 2, but showing an alternate form of the invention.

More particularly describing the invention, numeral 11 generally designates a garage door shown in overhead position in a doorway of which one side frame 12 is shown and the door will be understood to be supported upon hardware at each side, such as the hardware at one side generally designated 13. This hardware includes a mounting plate 14, a short lever 15 pivotally mounted on the door at 11' and the plate at 14'. The hardware further includes a long lever 16 on the door at 17 and pivotally mounted on the plate at 18. At its free end, the lever is yieldably restrained by a pair of conventional coil tension springs designated 19 which are shown connected between it and an anchor bracket 20 mounted on the door frame. In this instance a device 22 embodying the invention, serves as the means for connecting the lower ends of the springs to the anchor bracket 20.

The device 22 comprises a threaded rod 23 including an elongated straight-threaded section 24 which terminates at one end in a generally U-shaped hooked end portion 25. Preferably the hooked end portion provides two hooks in the same plane with the open portions thereof facing the other end of the rod. Each hook at the end of the rod is shown in engagement with an eye or loop strap 26 at the end of one of the springs.

Mounted on or receiving the rod is an axially slideable elongated sleeve 26 which has a longitudinal bore 27 of sufficient diameter that the sleeve can be easily moved over the threaded surface of the rod. This sleeve is provided with a hook 28 having a shank and a curved portion facing the hooks 25, the purpose of which is to provide means for securing it to the anchor bracket 20 as best shown in FIG. 3. At the far end of sleeve 26 with respect to the hooked end 25 of the rod, there is provided a nut 30 by means of which it is possible to shorten the distance between the hooked end of the rod and the sleeve, and hence place the spring under tension. Preferably a second nut designated 31 is provided on the rod at the other end of the sleeve serving chiefly as a means to lock the sleeve in adjusted portion.

It will be apparent that with the use of the device, the springs 18, or a single spring if only one is used, can be readily hooked onto the end of the rod and with nut 30 loosened or run down to the end of the rod, sleeve 26 hooked into an appropriate hole 20' of the bracket 20 without the necessity of stretching the springs. Nut 30 can then be tightened to draw down the rod 23 through the sleeve and hence tighten the springs to the desired degree of tension. Thus it is an easy matter to install and adjust the springs.

An alternate form of the invention is shown in FIG. 5 and designated 22A. In this form, a threaded rod 35 is provided at one end with an integral crossbar 36, also threaded, the two being welded together for convenience of manufacture. The crossbar is provided with nuts 37, preferably three on each side, to locate and firmly secure springs 19 or the like thereto. A slideable sleeve 26A with a hook 28A, similar to sleeve 26 and its hook 28, is provided on the rod 35 and nuts 30A and 31A threaded onto the rod below and above the sleeve, respectively. This device 22A is used in substantially the same way as device 22, except that the ends of the springs 19, or straps 26, receive the ends of the crossbar 36 and are retained in a located position thereon by suitable nuts 37 rather than merely by the hooked-shape end of the device 22.

I claim:

1. A device for securing and adjusting springs adapted to be connected between one or more elongated coiled tension springs and a bracket providing a hook-engageable portion, comprising a threaded rod having a hooked end adapted to hook onto the end of such spring, a sleeve receiving said rod and movable axially therealong, said sleeve having a hook thereon facing the hooked end of the rod and adapted to be hooked onto the bracket, and a nut on said rod beyond the end of said sleeve farthest from the hooked end of said rod.

2. The device of claim 1 in which a second nut is provided on said rod on the end of said sleeve nearest the hooked end of said rod.

3. The device of claim 1 in which the hooked end of the rod is characterized by a pair of hooks open toward the opposite end of the rod and contained in a common plane with one hook on each side of the rod.

4. The device of claim 3 in which a second nut is provided on said rod on the end of said sleeve nearest the hooked end of the rod.

5. A device for securing and adjusting springs adapted to be connected between one or more elongated coiled tension springs and an anchor bracket having a means for engaging a hook comprising:
   a. a rod having an elongated straight-threaded section;
   b. a hooked end, the hook of which faces said threaded section and is adapted to hook onto a connection means of such springs;
   c. a sleeve having a longitudinal opening for receiving said rod and movable axially therealong;
   d. a hook on the exterior of said sleeve facing the hooked end of said rod and adapted to be hooked to said anchor bracket; and e. a nut on said threaded section of said rod beyond the end of said sleeve furthest from said hooked end of said rod.

6. A device for securing and adjusting springs adapted to be connected between one or more elongated coiled tension springs and an anchor bracket having a hole therethrough for engaging a hook comprising:
  a. a rod having an elongated straight threaded section;
  b. a generally U-shaped hooked end integral to one end of said rod with the open portion of the U-shaped hook facing said threaded section and adapted to hook onto a connection means of such springs;
  c. an elongated sleeve having a longitudinal opening which has a diameter slightly larger than the diameter of the threaded section of said rod for receiving said rod and movable axially therealong;
  d. a hook having a shank and a curved portion, said shank being affixed to the exterior of said elongated sleeve as by welding or other convenient means with the curved portion of said hook facing the hooked end of said rod and adapted to be hooked to said anchor bracket through the hole therethrough; and
  e. a nut on said threaded section of said rod beyond the end of said sleeve furthest from said hooked end of said rod.

7. The device of claim 6 in which a second nut is provided on said rod on the end of said elongated sleeve nearest the hooked end of the rod.